United States Patent [19]
Schweiger

[11] Patent Number: 5,924,701
[45] Date of Patent: Jul. 20, 1999

[54] MULTI-LAYERED STEEL, DUAL-PURPOSE INTAKE/EXHAUST GASKET

[75] Inventor: David J. Schweiger, Downers Grove, Ill.

[73] Assignee: Dana Corporation, Toledo, Ohio

[21] Appl. No.: 08/925,947

[22] Filed: Sep. 8, 1997

[51] Int. Cl.⁶ .................................................... F02F 11/00
[52] U.S. Cl. ............................................. 277/597; 277/598
[58] Field of Search ................................. 277/591, 598, 277/596, 597

[56] References Cited

U.S. PATENT DOCUMENTS

| | | | |
|---|---|---|---|
| 3,924,863 | 12/1975 | Nakano et al. | 277/597 |
| 4,676,514 | 6/1987 | Beutter et al. | 277/596 |
| 5,306,024 | 4/1994 | Udagawa | 277/597 |
| 5,374,069 | 12/1994 | Pecina | 277/597 |
| 5,375,851 | 12/1994 | Mockenhaupt | 277/598 |

*Primary Examiner*—Anthony Knight
*Assistant Examiner*—Gary Grafel
*Attorney, Agent, or Firm*—Rader, Fishman & Grauer PLLC

[57] ABSTRACT

A dual purpose, multi-layered steel intake/exhaust manifold gasket is constructed from a rubber coated embossed single-layer intake manifold gasket attached to an uncoated embossed double-layer exhaust manifold gasket. The gaskets overlap at several discontinuous locations along a common edge by sandwiching the single layer intake manifold gasket between the two layers of the exhaust manifold gasket. Holes are provided in the rubber coated single layer at some of the overlapping locations to allow the two layers of the exhaust manifold gaskets to contact and be fastened together. An air gap is left between the two gaskets except for the areas of overlap to control heat transfer between the gaskets.

17 Claims, 3 Drawing Sheets

MULTI-LAYERED STEEL, DUAL-PURPOSE INTAKE/EXHAUST GASKET

FIELD OF INVENTION

The present invention relates to an intake/exhaust manifold gasket for an internal combustion engine. More particularly, the invention relates to a dual purpose, multi-layered steel intake/exhaust gasket formed by a separate intake manifold gasket and a separate exhaust manifold gasket attached together at predetermined locations for sealing both intake and exhaust manifold joints.

BACKGROUND OF THE INVENTION

Gaskets are often used as a seal between mating mechanical components. One common application of gaskets involves sealing intake and exhaust manifolds in a combustion engine. The intake gasket prevents fresh air coming into the engine and mixing with intake charge while the exhaust gasket seals combustion gases into the exhaust system. Typically, two separate gaskets are used to seal an intake manifold and the exhaust manifold. However, using two separate gaskets pose an inconvenience during assembly, and the potential for one of the gaskets to be misaligned or not installed. Another known design uses individual gaskets to seal each port. However, such a design multiplies the chances for misalignment or improper installation while incurring higher tooling and inventory costs. Still another known design that integrates both intake and exhaust manifold gaskets on one gasket plate forces both intake and exhaust manifolds to sit on a common plate, such that the intake and exhaust openings are arranged in a row.

SUMMARY OF THE INVENTION

A dual-purpose, multi-layered steel intake/exhaust manifold gasket according to the present invention comprises a one-piece intake manifold gasket combined with an exhaust manifold gasket to form a singular unit. The intake manifold gasket is made of one or more layers of steel, coated with elastomer, and embossed for sealing purposes with holes provided in predetermined areas for facilitating attachment to the exhaust manifold gasket. The exhaust manifold gasket is made of one or more layers. Each of the exhaust manifold gasket layers is formed as a single piece component made from uncoated stainless steel having embossments for improved sealability.

The dual-purpose multi-layered steel gasket is made by placing selected portions of the intake gasket in between the layers of the exhaust gasket. The exhaust gasket layers are then fixedly attached through the selected portions sandwiched between the layers of the exhaust gasket. When the two gaskets are combined, a gap is formed along their inner edges except for attachment areas. The gap controls heat transferred from the exhaust manifold gasket to the intake manifold gasket. Otherwise, heat from the exhaust manifold gasket could burn off the elastomeric coating on the intake manifold gasket, jeopardizing its sealability.

In one embodiment of the invention, the attachment of the two gaskets is facilitated by mechanical interlocks such as form-locks in areas where the two layers of the exhaust gasket contact through attachment holes formed through the intake gasket. The mechanical interlock is made by folding a portion of the lower exhaust gasket layer projecting through the attachment hole over the top exhaust gasket layer so as to positively retain the gasket assemblies together.

In another embodiment of the invention, attachment of the two gaskets are facilitated by spot-welding in selected areas where the two layers of the exhaust gasket contact each other through attachment holes in the intake gasket.

There are a number of advantages to the dual-purpose multi-layered steel intake/exhaust manifold gasket of the present invention. One advantage is that a single unit seals both intake and exhaust manifolds. Further, the present invention allows intake and exhaust manifolds to sit on their respective plates. Additionally, the number of gasket components are reduced to the minimum required for each joint while assembly is made simple and cost effective. The invention also ensures all seals, tabs, and interleaving are correctly aligned.

BRIEF DESCRIPTION OF DRAWINGS

The features and inventive aspects of the present invention will become more apparent upon reading the following detailed description, claims, and drawings, of which the following is a brief description:

DETAILED DESCRIPTION OF THE INVENTION

Figure 1:
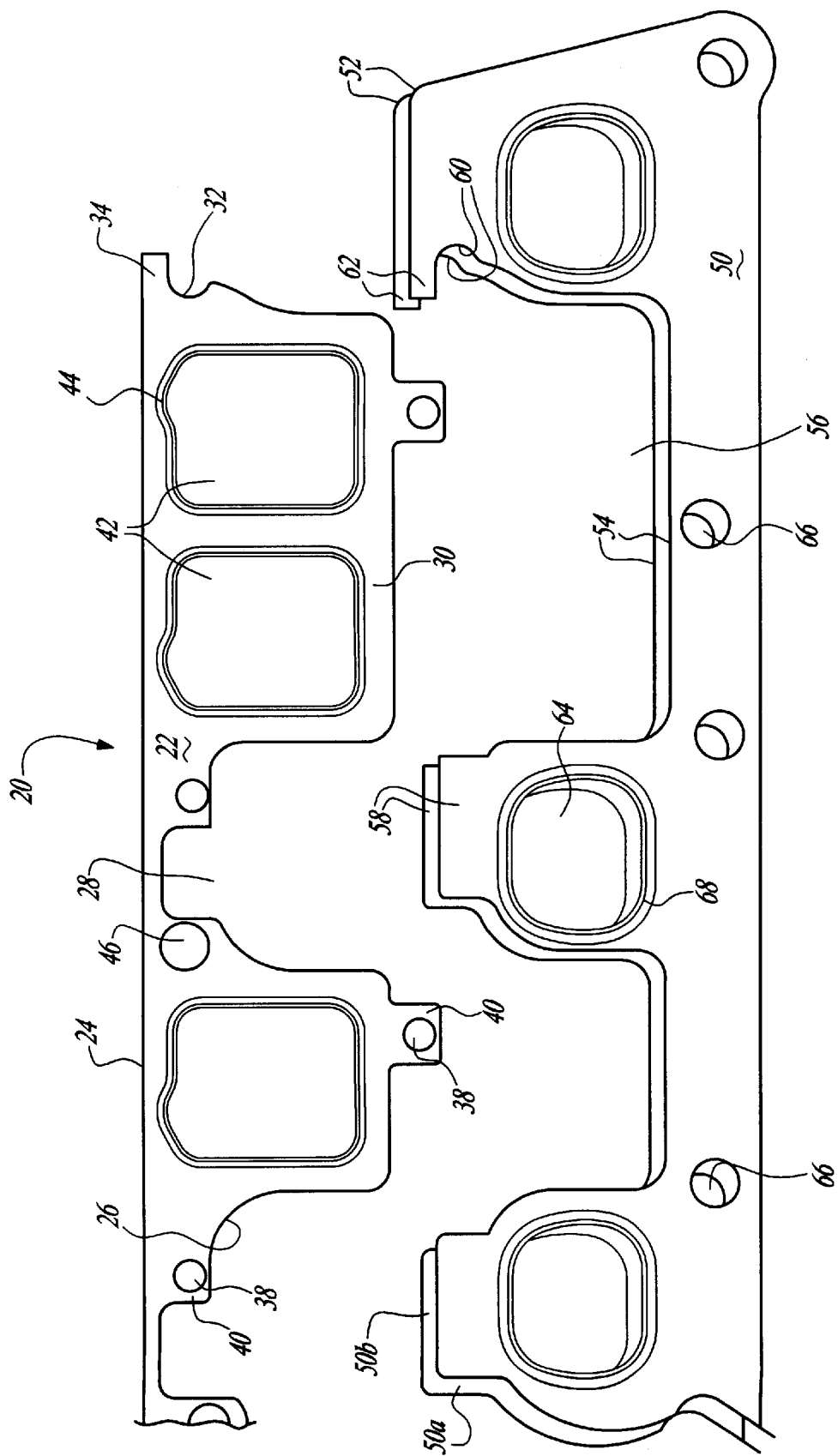
FIG. 1 is a partial view of an unassembled dual-purpose intake/exhaust manifold gasket of the present invention.

FIG. 1 is a partial, unassembled view of a multi-layered steel, dual-purpose intake/exhaust manifold gasket 20 of the present invention. Intake manifold gasket 22 is preferably constructed of full hard 301 stainless steel. However, any material deemed suitable by one of skill in the art can be used to construct intake manifold gasket 22. Intake gasket 22 is formed as a one-piece component defined by outer edge 24 and inner edge 26. The outer edge 24 is generally straight while inner edge 26 forms recessed portions 28 and projecting portions 30. Inner edge 26 also defines a semi-circular portion 32 formed along tab portion 34 at each end of intake manifold gasket 22. (Only one end shown)

Figure 7:
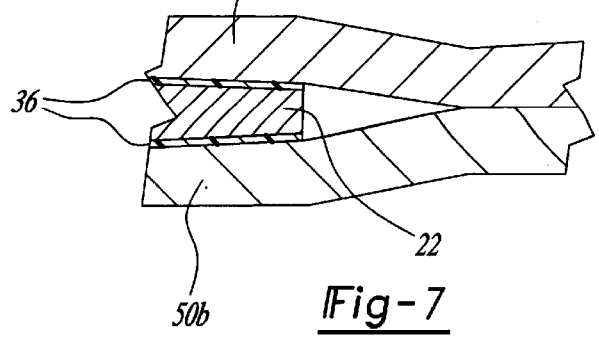
FIG. 7 is a fragmented view showing details contained in encircled region 7 in FIGS. 5 and 6.

Intake manifold gasket 22 is substantially covered with an elastomeric coating such as a rubber coating 36 (FIG. 7). Bores 38 extend through attachment tabs 40 formed along the inner edge 22 in selective locations to facilitate attachments to exhaust manifold gasket 50 as discussed further below. Intake manifold gasket 26 includes intake openings 42 for alignment with corresponding openings of an intake manifold (not shown). Each intake opening 42 is lined with an embossment 44 for providing a tight seal around the corresponding opening in the intake manifold (not shown) when engaged. Additionally, bolt holes 46 are provided in predetermined locations for attachment to an engine (not shown).

Exhaust manifold gasket 50 has an upper layer 50a and a lower layer 50b, each layer preferably being formed from uncoated, extra hard 301 stainless steel. However, any material deemed suitable by one of skill in the art can be used. Each of the upper layer 50a and lower layer 50b are formed as a one-piece component. Both upper layer 50a and lower layer 50b are each defined by an outer edge 52 and an inner edge 54. Outer edge 52 is generally straight while inner edge 54 forms recessed portions 56 and projecting portions 58. The inner edge 54 also defines semi-circular portions 60 formed along tab portions 62 at each end (only one end shown).

Figure 3:
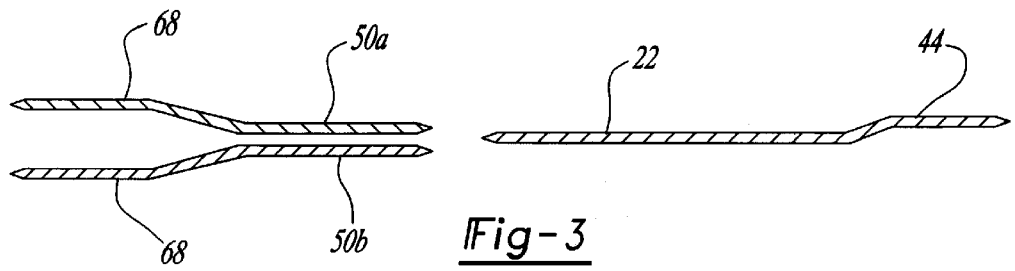
FIG. 3 is a cross-sectional view taken along lines 3—3 of FIG. 2.

Both upper layer 50a and lower layer 50b have exhaust openings 64 for alignment with corresponding openings of an exhaust manifold (not shown). Bolt holes 66 in predetermined locations are provided for attachment to the engine (not shown). Both upper layer 50a and lower layer 50b remain uncoated due to the temperature to which exhaust manifold gasket 50 is subjected to in operation. Having an uncoated metal surface may result in minor leakage under some instances, but the leakage is controlled by embossment geometry, bolt load, and engine hardware surface finish conditions. Therefore, each of the exhaust openings 64 on both upper layer 50a and lower layer 50b is lined with an embossment 68 to provide a tight seal when engaged to the corresponding openings of the exhaust manifold (not shown). Embossments of different heights and geometries, as shown in FIG. 3, are used for the intake manifold gasket 22 and exhaust manifold gasket 50 due to different mechanical requirements, and space limitations.

Figure 2:
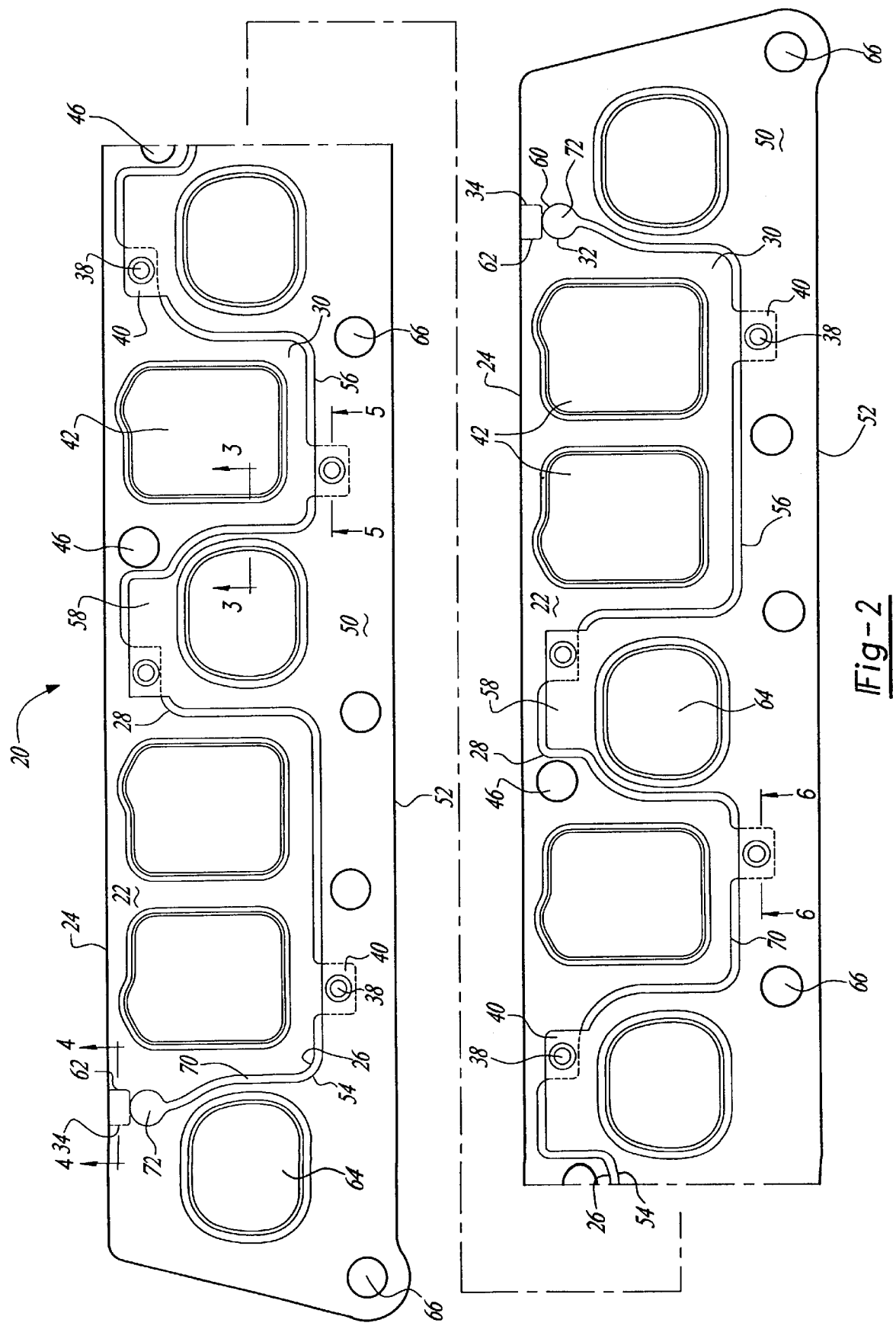
FIG. 2 is plan view of a fully assembled dual-purpose intake/exhaust manifold gasket of the present invention.
Figure 4:
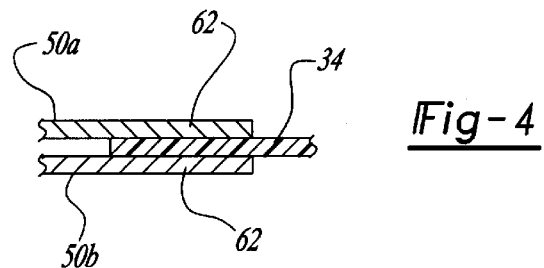
FIG. 4 is a cross-sectional view of the tabs taken along lines 4—4 of FIG. 2.

FIG. 2 shows an assembled, overall view of the multi-layered steel dual-purpose intake/exhaust manifold gasket 20 of the present invention. Dual-purpose gasket 20 is designed such that assembly is simplified. First, lower exhaust gasket layer 50b as best shown in FIG. 3 is placed on a fixture. Second, the intake gasket 22 is fitted alongside the lower exhaust gasket layer 50b, matching the projecting portions 30 and 58 with corresponding recessed portions 56 and 28 along inner edges 26 and 54 so that the outer edges 24 and 52 form a substantially rectangular shape. Attachment tabs 40 on intake gasket 22 are positioned to overlap lower exhaust gasket layer 50b at corresponding locations while intake gasket tab portion 34 overlaps tab portion 62 on lower exhaust gasket layer 50b. Third, upper exhaust gasket layer 50a is placed on top of lower exhaust gasket layer 50b matching all the corresponding exhaust openings 64 and bolt holes 66. Alignment of upper exhaust gasket layer 50a with lower exhaust gasket layer 50b effectively sandwiches attachment tabs 40 of intake gasket 22 between upper and lower layers 50a and 50b at corresponding locations. As shown in FIG. 4, tab portion 34 is sandwiched between tab portions 62 of upper and lower exhaust gasket layers 50a and 50b. Finally, upper layer 50a and lower layer 50b are fixedly attached to each other through bore 38 on each attachment tabs 40.

Once assembled, multi-layered steel dual-purpose gasket 50 forms a gap 70 between inner edges 26 and 54 except at attachment areas 40, 24, and 62. Gap 70 reduces the amount of heat transferred from exhaust gasket 50 to intake gasket 22. A minimization of heat transfer is necessary to ensure that rubber coating 36 on intake gasket 22 is not damaged by heat which might otherwise jeopardize the gasket's sealability. Furthermore, sandwiched tab portions 34 and 62 are not fixedly attached. Rather, tab portion 34 of intake gasket 22 is sandwiched between tab portions 62 of exhaust gasket layers 50a and 50b, connecting intake gasket 22 with exhaust gasket 50. Further semi-circular portions 32 and 60 now form substantially circular bolt holes 72 through which dual-purpose gasket 20 is fixed to the engine (not shown).

Figure 5:
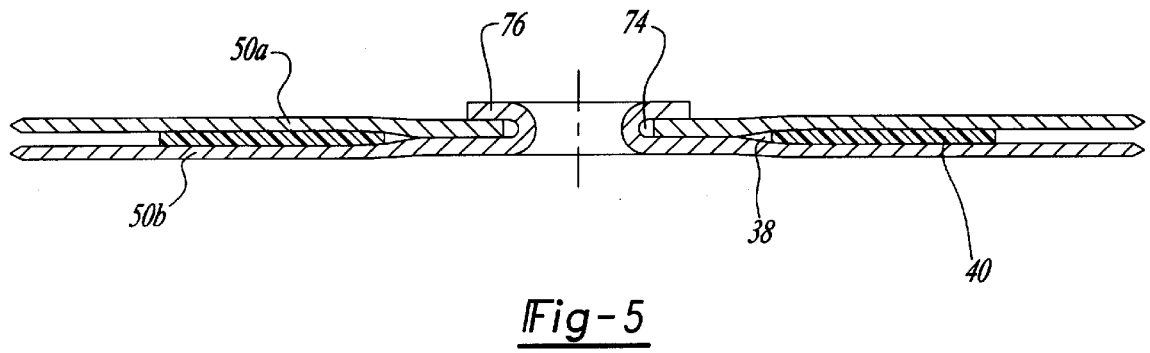
FIG. 5 is a cross-sectional view of one embodiment taken along lines 5—5 of FIG. 2.

As shown in FIG. 5, the preferred method of attaching intake gasket 22 to exhaust gasket 50 is by a mechanical interlock such as a form-lock as described below. A bore 74 is made through upper exhaust gasket layer 50a above an area covering bore 38 on attachment tab 40 of intake gasket 22. Next, fold portion 76 on lower exhaust gasket layer 50b is pushed through bores 32 and 74. Finally, the fold portion 76 is rolled over upper exhaust gasket layer 50a to form a mechanical interlock. A mechanical interlock such as a form-lock is generally preferred because it does not require extra components such as screws or nuts and it can be created with relative simplicity. Bore 74 can be made during manufacture of upper exhaust gasket layer 50a while a simple puncturing action may be used to push the fold portion 76 through bores 38 and 74 to be rolled onto upper exhaust gasket layer 50a.

Figure 6:
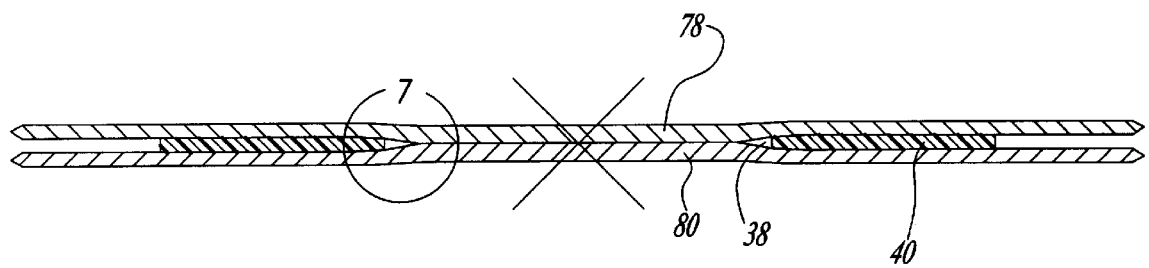
FIG. 6 is a cross-sectional view of another embodiment taken along lines 6—6 of FIG. 2.

An alternate method for attaching intake gasket 22 to exhaust gasket 50 involves spot welding. As shown in FIG. 6, upper weld portion 78 of upper exhaust gasket layer 50a and lower weld portion 80 of lower exhaust gasket layer 50b contact each other through bore 38 on attachment tabs 40 of intake gasket 22. Upper and lower weld portions 78 and 80 are spot welded together to form a fixed attachment between intake gasket 22 and exhaust gasket 50. Yet other methods for attaching intake gasket 22 to exhaust gasket 50 include shear locks and rivets.

Having fully described the preferred embodiments of the invention, variations and modifications may be employed without departing from the scope of the present invention. Accordingly, the following claims should be studied to learn the true scope of the present invention.

What is claimed is:

1. A dual-purpose intake/exhaust manifold gasket comprising:

an intake manifold gasket including a first inner edge and a plurality of intake openings to be aligned with an intake manifold; and an exhaust manifold gasket including a second inner edge and a plurality of exhaust openings to be aligned with an exhaust manifold;

wherein said first inner edge is aligned with said second inner edge, and said intake manifold gasket is fixedly attached to said exhaust manifold gasket at discrete locations so as to form a gap between said intake manifold gasket and said exhaust manifold gasket along said first and second inner edges to limit heat transfer from said exhaust manifold gasket to said intake manifold gasket.

2. A gasket of claim 1, wherein said gap runs along the full length of said alignment of said first and second inner edges interrupted only at said discrete locations where the attachments are made.

3. A gasket of claim 2, wherein said gap has a constant width along the full length of said alignment of said first and second inner edges.

4. A dual-purpose intake/exhaust manifold gasket comprising:

a one-piece intake manifold gasket including a plurality of intake openings to be aligned with an intake manifold and at least one attachment opening in a predetermined location;

an exhaust manifold gasket including a plurality of exhaust openings to be aligned with an exhaust manifold; and wherein said intake manifold gasket is fixedly attached to said exhaust manifold gasket at said attachment opening.

5. The gasket of claim 4, wherein said intake manifold gasket is coated with an elastomer.

6. The gasket of claim 4, wherein said exhaust manifold gasket includes an upper layer and a lower layer.

7. The gasket of claim 6, wherein each of said upper layer and said lower layer are made of a one-piece component.

8. The gasket of claim 7, wherein said upper and lower layers are fixedly attached by mechanical interlocking at said attachment opening in said predetermined location.

9. The gasket of claim 7, wherein said upper and lower layers are fixedly attached by welding at said attachment opening in said predetermined location.

10. The gasket of claim 4, wherein said plurality of intake openings and said plurality of exhaust openings include embossments with varying geometries.

11. The gasket of claim 4, wherein said dual-purpose intake/exhaust manifold gasket further includes a gap extending therethrough, said gap being positioned between said intake manifold and said exhaust manifold for limiting heat transfer from said exhaust manifold gasket to said intake manifold gasket.

12. The gasket of claim 11, wherein said gap extends between inner edges of said intake and said exhaust manifold gaskets, except at said predetermined locations.

13. The gasket of claim 6, wherein said intake manifold gasket and said layers of said exhaust manifold gasket further include tabs at predetermined locations, wherein said tabs of said exhaust manifold gasket layer sandwich said tabs of said intake manifold to form non-permanent connections.

14. A dual-purpose intake/exhaust manifold gasket comprising:

a one-piece intake manifold gasket including a plurality of intake openings to be aligned with an intake manifold and at least one attachment opening in a predetermined location;

an exhaust manifold gasket including an upper layer and a lower layer, each said layers having a plurality of exhaust openings to be aligned with an exhaust manifold; and wherein said intake manifold gasket is sandwiched between said upper layer and said lower layer at said attachment opening and said intake manifold gasket is fixedly attached to said exhaust manifold gasket at said attachment opening.

15. A dual-purpose intake/exhaust manifold gasket comprising:

a one-piece intake manifold gasket including a plurality of intake openings to be aligned with an intake manifold and at least one attachment opening in a predetermined location; and an exhaust manifold gasket including an upper layer and a lower layer, each said layers having a plurality of exhaust openings to be aligned with an exhaust manifold;

wherein said intake manifold gasket is sandwiched between said upper layer and said lower layer at said attachment opening and said intake manifold gasket is fixedly attached to said exhaust manifold gasket at said attachment opening so as to form a gap between said intake manifold gasket and said exhaust manifold gasket along a common edge except at attachment locations to limit heat transfer from said exhaust manifold gasket to said intake manifold gasket.

16. The gasket of claim 15, wherein said upper and lower layers are fixedly attached by mechanical interlocking at said opening in said predetermined location.

17. The gasket of claim 15, wherein said upper and lower layers are fixedly attached by welding at said opening in said predetermined location.

* * * * *